June 18, 1963 G. J. ZAHER 3,093,905
DIRECTION FINDER
Filed May 6, 1959

INVENTOR.
GEORGE J. ZAHER
BY
ATTORNEY

United States Patent Office 3,093,905
Patented June 18, 1963

3,093,905
DIRECTION FINDER
George J. Zaher, 537 3rd Ave., Brooklyn, N.Y.
Filed May 6, 1959, Ser. No. 811,392
3 Claims. (Cl. 33—75)

The present invention relates to a direction finder and it particularly relates to a nautical direction finder which may be readily used by amateurs as well as professionals in connection with direction finding at sea with either large or small vessels.

It is among the objects of the present invention to provide a direction finder which may be readily used by persons without special training and which may be readily used in connection with the piloting of small craft in inland or offshore waters.

Another object is to provide a direction indicator which will readily enable small boat operators, as well as those operating larger craft, to quickly and accurately determine the direction in which they should move their craft, without complex mathematical computations and without distracting their attention from the navigational problems involved in connection with movement of the craft of which they are in control.

A particular object of the present invention is to provide a navigational instrument which may be used in conjunction with or in combination with a nautical chart for correction or determination of a course to be taken in conjunction with the boat compass, which will provide a ready and simple means for determining various navigational headings required to properly give a desired navigational course, with ready elimination of error due to different locations, variations and boat compass deviations and without the need of consulting complicated tables or without making difficult mathematical calculations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to provide a base member having a rectangular shape having a plurality of graduations thereon extending from side to side and parallel to each other over the full length thereof.

This rectangular base member may consist of a rectangular plate of a transparent material, such as sheet plastic or glass and it may be made of multi-ply or multi-laminar construction.

The preferred transparent plastic materials are sheet vinyl acetate or methyl methacrylate or similar plastic materials resistant to the effect of salt air or water, retaining their transparency without clouding or cracking over long periods of time.

Between the plies there is generally pivotally mounted a circular member upon which are marked the various compass headings with number and inner circles graduated in degrees and in various headings, such as N (north), NNE (north northeast), NE (northeast), ENE (east northeast) and E (east), as well as other intermediate graduations with similar markings for the other four quarters of the compass.

This dial is accessible through the opening in one side plate so that it may be adjusted or turned to set the compass dial at a position which will correct every variation in degrees to correspond with the magnetic variations shown on a nautical chart compass rose also used if necessary for setting the magnetic deviations of the boat compass as known over the course which is to be navigated.

On the same pivotal mounting as carries the graduated compass dial, is also pivotally mounted the deviation calculator arrow. This arrow is used either to indicate the direction of destination or to enable determination of the course to be followed on the nautical chart.

The instrument which is preferably used, according to the present application, will enable ready applying of a course upon a chart or map and it can be used not only for actual navigation but for instructional purposes on land.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
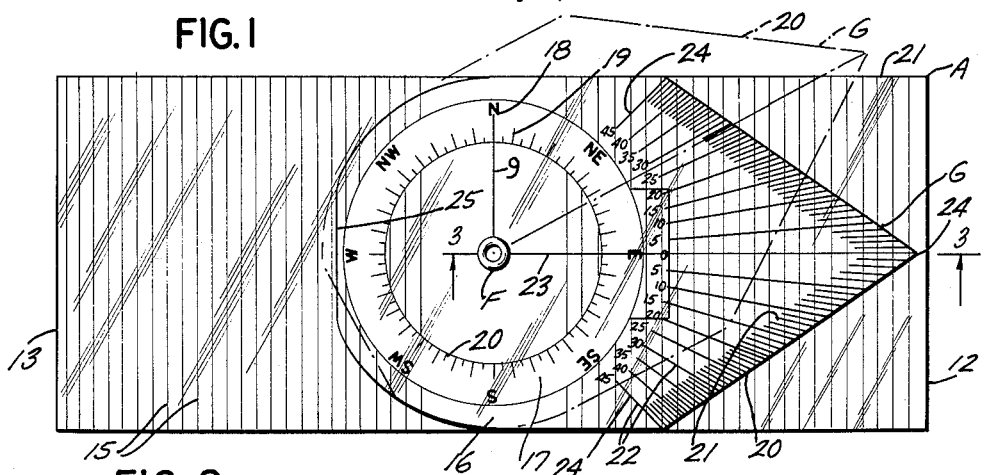
FIGURE 1 is a top plan view of the instrument, showing the upper side thereof where the swingable arrow is mounted and showing the face of the compass dial which is mounted between the two sheets of transparent material.
Figure 2:
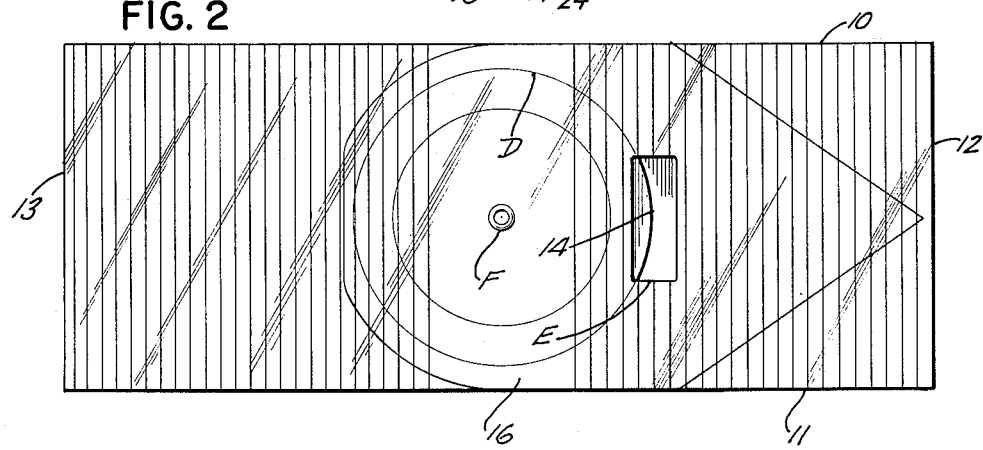
FIG. 2 is a rear elevational view, showing the access window for adjusting the compass dial.
Figure 3:
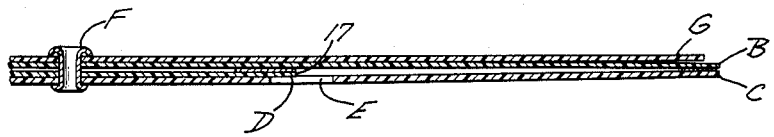
FIG. 3 is a fragmentary transverse sectional view upon the line 3—3 of FIG. 1.

Referring to FIGS. 1 to 3, there is shown a base A consisting of an upper plate B and a lower plate C, between which is positioned the rotatable compass dial D, accessible through the window E, which window is positioned in the lower plate C.

The deviation calculator arrow G is pivotally mounted on the same axis as the compass dial D and is positioned on top of the plate B.

The pivot mount F will hold together the upper and lower plates B and C, as well as the intermediate dial D, and this pivot rivet or stud F will also hold in position the swingable direction arrow G.

The upper and lower plates B and C may be connected together along their edges 10 and 11, as well as their ends 12 and 13.

The edges 10, 11, 12 and 13 may be connected by transparent tape or the plates B and C may be heat sealed together at their edges 10, 11, 12 and 13. If desired, a single plate B or C may be used, and recessed or indented to receive the rotatable compass dial. The dial D may be turned by engaging its projecting edge 14 where it is accessible through the window E.

Both or only one of the plates are provided with the parallel transverse graduations 15 which extend the full length of the instrument A, these graduations only being omitted directly over the central area of the dial, as indicated at 16.

The dial itself, which is held between the two plates by means of the cylindrical ring F, has a circular annular sheet 17 superimposed thereon, on which are placed the various points of the compass, as indicated for example by the letter N at 18, with the graduations 19 being positioned around the circle 20 giving the various degrees from zero to 360.

The deviation calculator arrow G is also held in position by the cylindrical rivet F and the oblique sides 20 thereof are graduated, as indicated at 21, by the various radiating lines 22.

The arrow G has a semi-circulator base portion which is pivotally mounted at its center on the eyelet and is turnable on top of the upper plate B.

The arrow lines 22 are graduated in degrees from 0° at the center line 23 to 45° at each terminal side graduation 24.

There is a center line 23 extending from the pivot F to the point 24. The line 23 functions to correspond to the line drawn on a chart and to give the reading on the compass dial of the degrees to be followed on the boat compass.

In using the direction finder, the compass dial D is used to offset the amount of variation degrees between magnetic north and true north by setting it at the same variation degrees shown on the chart compass rose in the area being navigated.

Next, the compass dial D is reset or adjusted by adding or subtracting to or from the present setting the known boat compass deviation. This will result in the instrument correction taking care of both variation and deviation.

Then the instrument is placed on the chart over the position of boat so that the opening in the pivot F is directly above the position of the boat on the nautical chart with transverse line 9 on plate B facing true north on the nautical chart at all times and the parallel lines 15 extending parallel to the meridian or being positioned on the meridian lines.

While holding the instrument firmly in this position on the nautical chart the arrow G is rotated to a position so that the line 23 will be in the direction of the next point or place of destination.

At this point the position of line 23 on the compass dial is read which will determine the heading to be maintained on the boat compass.

When the boat arrives at the destination or to the point where the course changes, the same procedure may be followed to achieve the new heading with the deviation calculating arrow G.

The present instrument will permit a course to be planned or plotted which has many extreme direction headings, with the deviation degrees on the boat compass varying with each change of course.

When this is done it may be desirable to omit shifting the compass dial D, and in this case the known boat compass deviations are added or subtracted for each new heading with the deviation calculating arrow G.

When desirable the edge of the instrument of FIGS. 1 to 3 may be used as a ruler and the lines may be drawn upon a chart of the course to be taken, whereupon the step of rotating the compass dial on the instrument is done only once for the setting of the variation in degrees to correspond with the compass rose on the chart shown in the area being navigated.

Now passing the instrument on the chart above your position the center line 23 of the deviation arrow G is rotated onto the line of your course. Then, using the arrow line 22 the easterly or westerly boat compass deviation degrees are added or subtracted to or from the line of the course.

The corrected heading held on the compass of the vessel or craft will be where the hairline 23 of the arrow G crosses the graduations on the compass dial D.

It is thus apparent that the applicant has provided a novel, readily applied navigational instrument for computing courses which may be readily corrected for magnetic deviation, either by setting it in the dial or by correcting each heading therefor.

The instrument described may be readily used by a layman as well as by a skilled navigator and it is not necessary to use involved or complicated tables.

Having now particularly described and ascertained the nature of the invention, and in what manner the same is to be performed, what is claimed is:

1. A flat rectangular four ply transparent plastic direction finder having from top to bottom a first ply deviation calculator arrow having parallel side edges, a semicircular base portion and opposite oblique converging graduated side edges, a second ply consisting of an elongated rectangular member extending on both sides beyond the ends of the first ply and having a plurality of closely spaced parallel graduations over both ends thereof but centrally omitted, a third circular ply positioned below the second ply intermediate the ends thereof and inside of the side edges of the second ply having peripheral graduations over 360° of compass headings and a bottom fourth rectangular ply of the same size and length as the second ply, said third ply being adjustable to correct for magnetic variation and said first ply being adjustable to indicate direction to be steered, said plies being centrally fastened together.

2. The finder of claim 1, said fastening consisting of a pivot mounting for the arrow and the circular ply and including a hollow rivet which enables correct location of the direction finder upon a chart and the fourth ply having a rectangular opening to permit access to the circular ply.

3. A navigational instrument for determining course directions in respect to a navigational chart, comprising an elongated double rectangular base having a plurality of closely spaced parallel graduations to permit the instrument to be placed upon and correctly lined up on a navigational chart, an intermediate rotatable compass dial mounted between the double plate to give the correct heading and a superimposed movable course arrow having a semi-circular base to be directed to the next point on the course and to give the proper course heading in respect to said dial, said rectangular base consisting of top and bottom elongated plastic rectangular members joined at their edges and said compass dial being rotatably mounted between said members and held in adjusted position by friction between said members, an eyelet acting as a pivot center and holding said rectangular members, said compass dial and said semi-circular base closely together to cause frictional retention of the compass dial and a window above the periphery of the dial and below the semi-circular base of the arrow on the top member to permit adjustment of said compass dial, and said arrow having oblique sides to form a point away from the eyelet and said spaced graduations extending parallel to each other the full length of the rectangular base transverse to the long dimension thereof but omitted for a short space on each side of the eyelet and the edges of the dial being radially graduated and the oblique sides of the arrow also being radially graduated.

References Cited in the file of this patent

UNITED STATES PATENTS

| 1,058,512 | Aanstoots | Apr. 8, 1913 |
| 1,292,337 | Lindberg | Jan. 21, 1919 |
| 1,330,839 | Brynge et al. | Feb. 17, 1920 |
| 2,238,190 | Sawtelle | Apr. 15, 1941 |
| 2,345,020 | Warner | Mar. 28, 1944 |
| 2,357,131 | Putnam | Aug. 29, 1944 |
| 2,485,674 | Suiter | Oct. 25, 1949 |

FOREIGN PATENTS

| 671,123 | Germany | May 17, 1941 |